(12) United States Patent
Jensen et al.

(10) Patent No.: US 9,610,963 B2
(45) Date of Patent: Apr. 4, 2017

(54) VEHICLE TIRE CART

(71) Applicant: Chariot Concepts LLC, Yuba City, CA (US)

(72) Inventors: Dannie R. Jensen, Yuba City, CA (US); Douglas P. Gibbs, Yuba City, CA (US)

(73) Assignee: Chariot Concepts LLC, Yuba City, CA (US)

( * ) Notice: Subject to any disclaimer, the term of this patent is extended or adjusted under 35 U.S.C. 154(b) by 0 days.

(21) Appl. No.: 15/095,503

(22) Filed: Apr. 11, 2016

(65) Prior Publication Data

US 2016/0325772 A1 Nov. 10, 2016

Related U.S. Application Data

(60) Provisional application No. 62/179,385, filed on May 6, 2015.

(51) Int. Cl.
*B62B 3/04* (2006.01)
*B62B 3/10* (2006.01)

(52) U.S. Cl.
CPC . *B62B 3/10* (2013.01); *B62B 3/04* (2013.01)

(58) Field of Classification Search
CPC .................................. B62B 3/04; B62B 3/10
USPC ..................................... 280/79.11, 79.4, 79.5
See application file for complete search history.

(56) References Cited

U.S. PATENT DOCUMENTS

| 3,951,287 | A |   | 4/1976  | Cofer |   |
|-----------|---|---|---------|-------|---|
| 4,035,864 | A | * | 7/1977  | Schroder | ............... B60B 33/021 |
|           |   |   |         |       | 16/35 R |
| 4,449,881 | A |   | 5/1984  | Lane |   |
| 4,460,306 | A |   | 7/1984  | Hawkins |   |
| 4,496,449 | A |   | 1/1985  | Rocca |   |
| D349,385  | S |   | 8/1994  | Suggs, Sr. |   |
| 5,385,440 | A |   | 1/1995  | Raben |   |
| 5,681,141 | A |   | 10/1997 | Critel |   |
| 6,179,542 | B1 |  | 1/2001  | Haven |   |
| 6,349,951 | B1 | * | 2/2002  | Mogensen | .............. B60B 30/10 |
|           |   |   |         |       | 280/33.998 |
| 6,390,759 | B1 |  | 5/2002  | Novak |   |

(Continued)

OTHER PUBLICATIONS http://www.wheeltrolley.com/en/products/ ; Flex 1 one Trolley Products ; Printed and Received Mar. 17, 2016.

(Continued)

*Primary Examiner* — John Walters
(74) *Attorney, Agent, or Firm* — Neustel Law Offices; Michael S. Neustel

(57) ABSTRACT

A vehicle tire cart for safely storing and transporting stacked vehicle tires and wheels. The vehicle tire cart generally includes a platform having an opening with an anchor located therein and is configured to receive a plurality of stacked vehicle tires. A lower surface of the platform comprises a plurality of casters which may be a combination of stationary and swivel casters that allow the vehicle tire cart to rotate to accommodate steering and directional changes during transportation while also easily traveling in a straight path. The anchor may be integral to a removable retaining strap plug configured to be retained within the platform opening and allow a retaining strap to thread under the anchor to secure stacked vehicle tires resting on the upper platform surface.

25 Claims, 19 Drawing Sheets

(56) References Cited

U.S. PATENT DOCUMENTS

| | | | |
|---|---|---|---|
| 6,656,301 B2 | 12/2003 | Kirby | |
| 6,773,222 B1 | 8/2004 | Gilchrist | |
| 6,863,488 B2 | 3/2005 | Chopra | |
| 7,178,669 B2 | 2/2007 | Atkinson | |
| 7,232,138 B2 | 6/2007 | Shubert | |
| D587,491 S | 3/2009 | Casper | |
| 7,597,524 B2 | 10/2009 | Hernandez | |
| 7,918,637 B2 | 4/2011 | Wolterman | |
| 8,061,952 B1 | 11/2011 | Scherden | |
| 8,475,109 B2 | 7/2013 | Torrison | |
| 8,882,434 B2 | 11/2014 | LaBruyere | |
| 2005/0151335 A1* | 7/2005 | King | B62B 1/264 |
| | | | 280/79.4 |
| 2005/0254923 A1 | 11/2005 | Gorski | |
| 2006/0261566 A1* | 11/2006 | Mulvihill | A45C 11/00 |
| | | | 280/47.131 |
| 2007/0182115 A1 | 8/2007 | Groomes | |
| 2007/0286713 A1 | 12/2007 | Giese | |
| 2008/0131246 A1* | 6/2008 | Altman | B62D 43/002 |
| | | | 414/463 |

OTHER PUBLICATIONS http://www.wheeltrolley.com/en/products/wheel-pallet/ ; Wheel Pallet ; Printed and Received Mar. 17, 2016.
http://www.wheeltrolley.com/en/products/wheel-trolley/ ; Wheel Trolley ; Printed and Received Mar. 17, 2016.
http://www.wheeltrolley.com/en/products/wheel-trolley-xl/ ; Wheel Trolley XL ; Printed and Received on Mar. 17, 2016.

* cited by examiner

VEHICLE TIRE CART

CROSS REFERENCE TO RELATED APPLICATIONS

I hereby claim benefit under Title 35, United States Code, Section 119(e) of U.S. provisional patent application Ser. No. 62/179,385 filed May 6, 2015. The 62/179,385 application is hereby incorporated by reference into this application.

STATEMENT REGARDING FEDERALLY SPONSORED RESEARCH OR DEVELOPMENT

Not applicable to this application.

BACKGROUND

Field

Example embodiments in general relate to a vehicle tire cart for storing and transporting vehicle tires.

Related Art

Any discussion of the related art throughout the specification should in no way be considered as an admission that such related art is widely known or forms part of common general knowledge in the field.

Conventionally, vehicle tires are transported and/or stored using hand trucks, movers' dollies, drum rollers, or other rolling appliances that are not specially adapted for the purpose of moving and storing heavy and bulky vehicle tires. Not only are these devices often heavy and expensive, they are often unsafe as they leave stacks of vehicle tires unsecured and therefor prone to toppling during transport or storage, potentially causing injury in the process. Additionally, many of these conventional devices for moving vehicle tires require the assistance of a second person due to the heavy weight of stacked vehicle tires and lack of maneuverability resulting from the overall vehicle tire bulkiness. While these previously known devices for moving objects are suitable for transporting and storing certain items, they are not suitable for safely and easily transporting, storing and displaying vehicle tires.

SUMMARY

An example embodiment of the present invention is directed to a vehicle tire cart. The vehicle tire cart includes a platform having an opening with an anchor therein around which a retaining strap may be threaded to secure a stack of vehicle tires and a plurality of caster wheels on a lower surface of the platform.

There has thus been outlined, rather broadly, some of the features of the vehicle tire cart in order that the detailed description thereof may be better understood, and in order that the present contribution to the art may be better appreciated. There are additional features of the vehicle tire cart that will be described hereinafter and that will form the subject matter of the claims appended hereto. In this respect, before explaining at least one embodiment of the vehicle tire cart in detail, it is to be understood that the vehicle tire cart is not limited in its application to the details of construction or to the arrangements of the components set forth in the following description or illustrated in the drawings. The vehicle tire cart is capable of other embodiments and of being practiced and carried out in various ways. Also, it is to be understood that the phraseology and terminology employed herein are for the purpose of the description and should not be regarded as limiting.

Embodiments of a vehicle tire cart may comprise a substantially round platform configured to store a plurality of vehicle tires on an upper surface of the platform. A lower surface of the platform includes a plurality of caster wheels which may comprise stationary and/or swivel caster wheels. The platform has an opening having an anchor which may be coupled to a removable retaining strap plug that fits within the platform opening. To secure a stack of tires to the platform, a retaining strap may be passed under the anchor to safely and securely fasten the stack of tires to the platform to prevent tipping and possible human injury during tire storage and transportation. The lower platform surface may comprise one or more integral structural ribs to increase the overall strength of the platform. Some embodiments may further comprise a removable pole and signage that is intended to allow the vehicle tire cart to serve as a retail display.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Unless otherwise defined, all technical and scientific terms used herein have the same meaning as commonly understood by one of ordinary skill in the art to which this invention belongs. Although methods and materials similar to or equivalent to those described herein can be used in the practice or testing of the vehicle tire cart, suitable methods and materials are described above. All publications, patent applications, patents, and other references mentioned herein are incorporated by reference in their entirety to the extent allowed by applicable law and regulations. The vehicle tire cart may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. As used herein, phrases such as "make contact with," "coupled to," "touch," "interface with" and "engage" may be used interchangeably.

The features, structures, or characteristics of the invention described throughout this specification may be combined in any suitable manner in one or more embodiments. For example, the usage of the phrases "exemplary embodiments", "some embodiments" or other similar language refers to the fact that a particular feature, structure, or characteristic described in connection with the embodiment may be included in at least one embodiment of the present invention. Thus, appearances of the phrases "exemplary embodiments", "in some embodiments", "in other embodiments" or other similar language, throughout this specification do not necessarily all refer to the same group of embodiments, and the described features, structures, or characteristics may be combined in any suitable manner in one or more embodiments.

Figure 1:
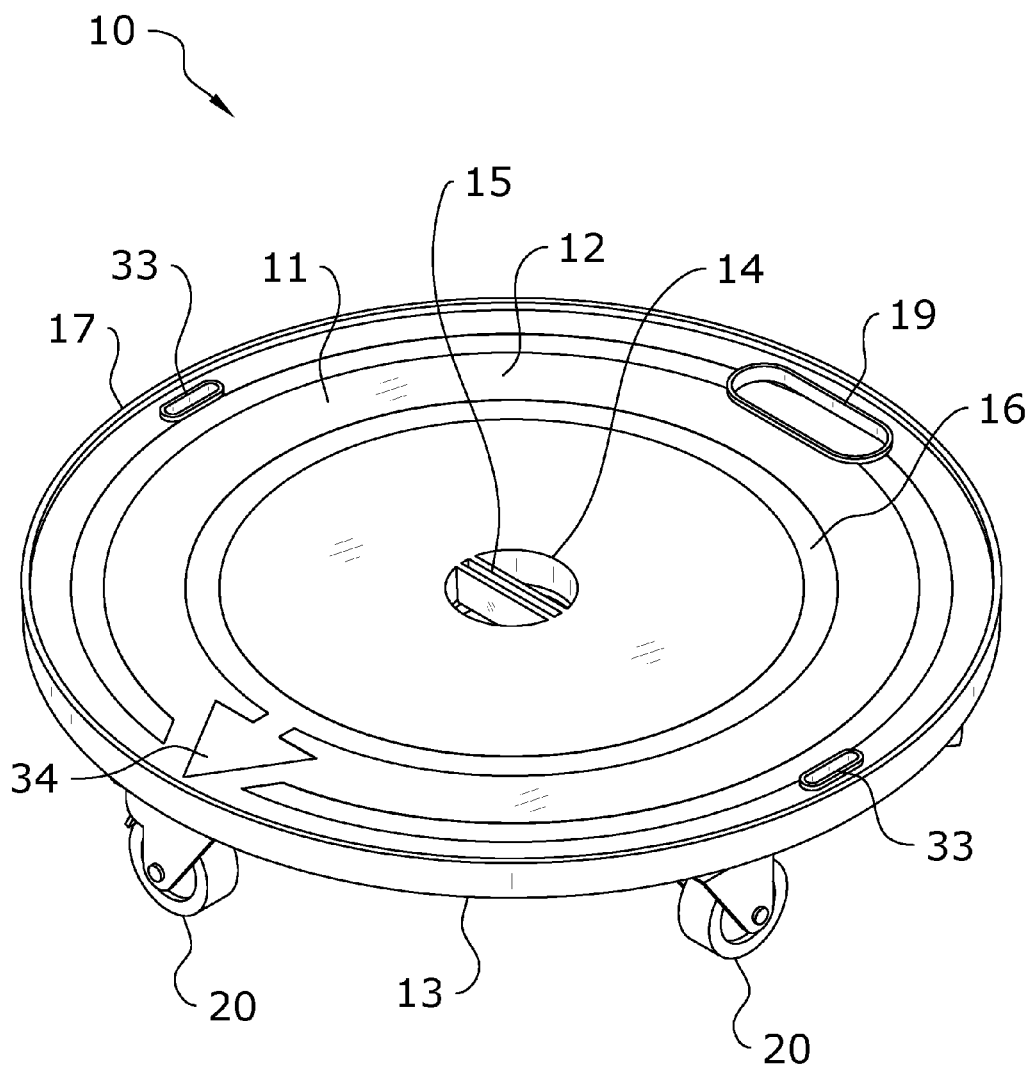
FIG. 1 is a top perspective view of a vehicle tire cart in accordance with an exemplary embodiment.
Figure 4:
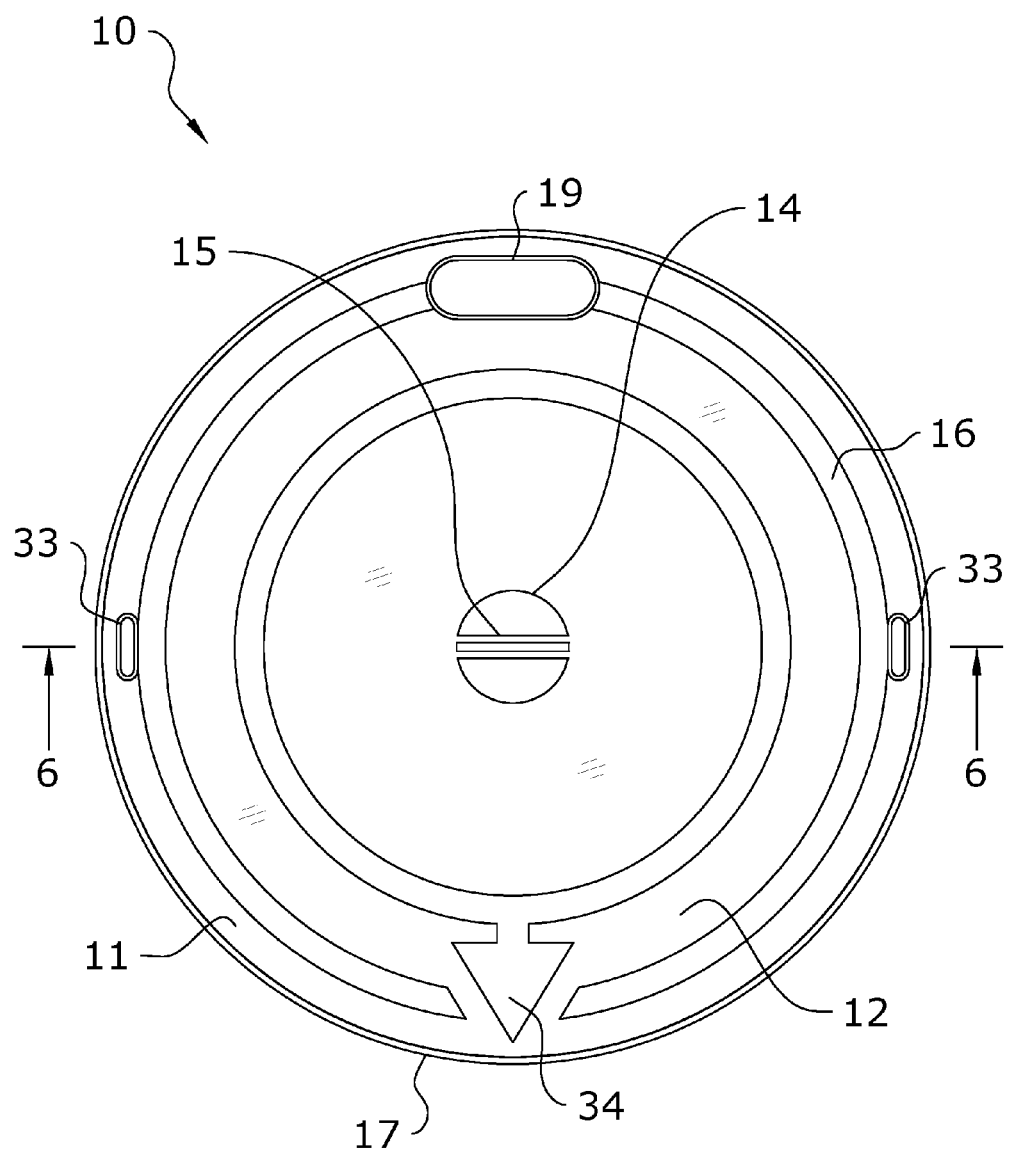
FIG. 4 is a top view of a vehicle tire cart in accordance with the exemplary embodiment of FIGS. 1-3.

FIG. 1 provides an exemplary embodiment of a vehicle tire cart 10 which may be used to secure vehicle tires 28, wheels, or other objects for safe and convenient storage and transportation. As shown, platform 11 may be substantially round, however, this shape is merely provided as a non-limiting example and it is contemplated that the platform may have any other appropriate shape such as elliptical, square, rectangular, or an irregular geometric shape. The platform 11 may be comprised of any material, however, in some embodiments, it may be preferable that the platform 11 be comprised of a flexible plastic or polymer material, such as by non-limiting example, high density polyethylene (HDPE). The upper surface 12 of platform 11 may comprise one or more textural elements 16, as shown in FIGS. 1 and 4, to provide additional grip to prevent objects placed on the upper surface 12 from sliding during transport. Additionally, the upper surface 12 of the platform 11 may comprise one or more directional indicators, shown here by non-limiting example as a molded arrow 34, to indicate to a user a direction in which the vehicle tire cart 10 may be easily moved in a straight direction, which will be described more fully below with regard to FIGS. 13-13A.

The platform 11 comprises an anchor 15 to which a retaining strap 25 may be attached to secure a load of vehicle tires 28 or other objects to the platform 11 for storage or transportation. In some embodiments, as shown in FIG. 1, the anchor 15 may be structured as a crossbar within an opening 14 of the platform 11, however in other embodiments, the anchor 15 may be coupled to the upper 12 or lower platform surface 13 and may comprise a bracket, hook, or other suitably rigid structure configured to secure a retaining strap 25. The anchor 15 may comprise one or more pieces of anchoring material and may be integral to or removable from the platform 11.

Figure 2:
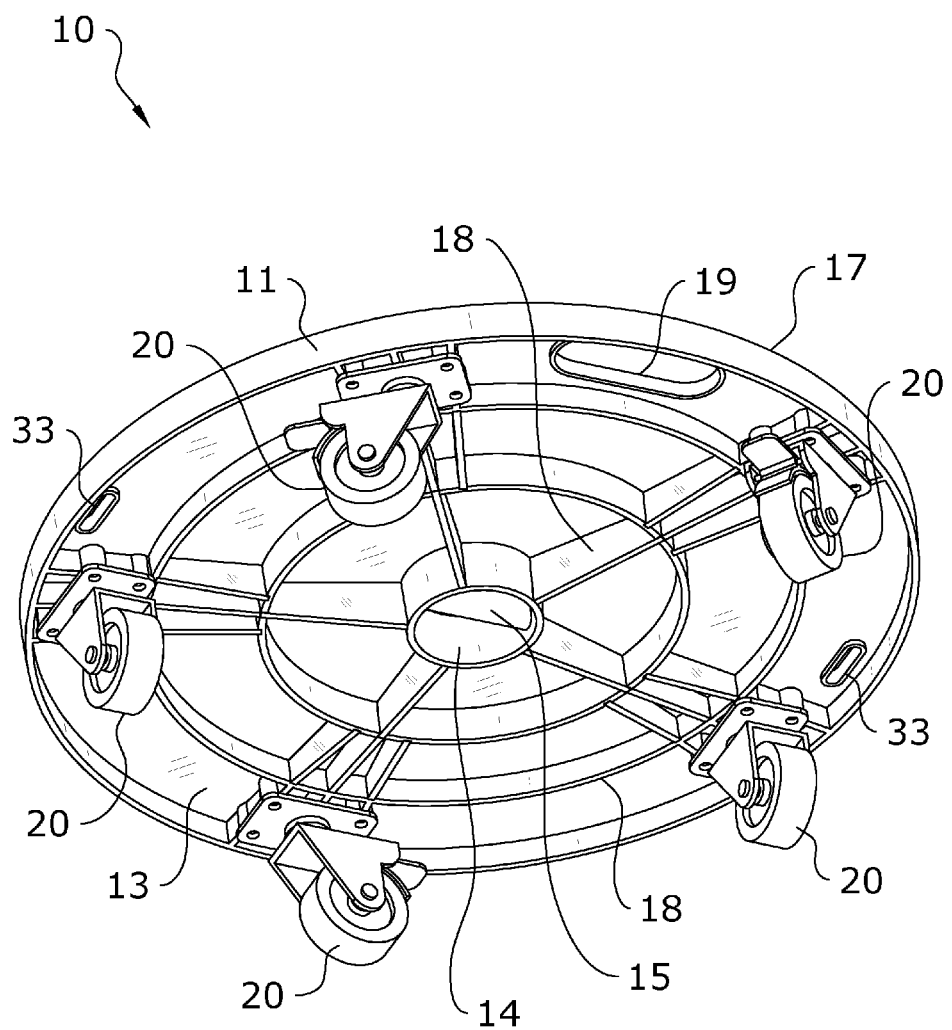
FIG. 2 is a bottom perspective view of a vehicle tire cart in accordance with the exemplary embodiment of FIG. 1.
Figure 3:
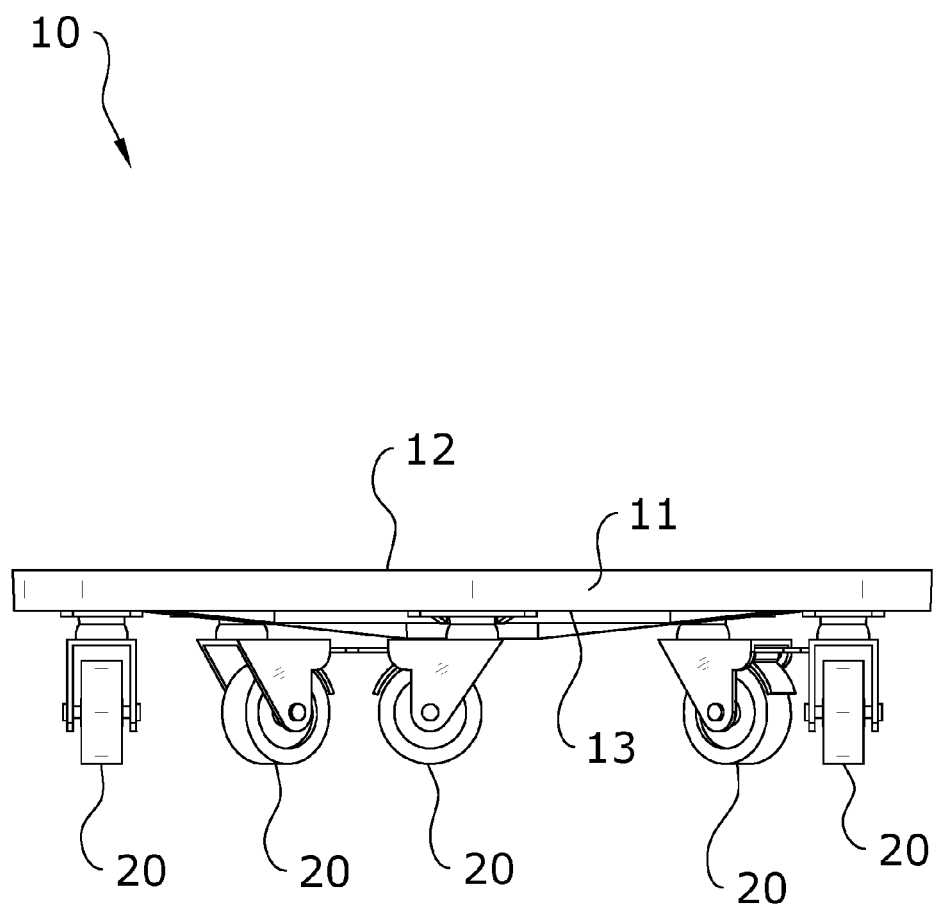
FIG. 3 is a side view of a vehicle tire cart in accordance with the exemplary embodiment of FIGS. 1-2.
Figure 5:
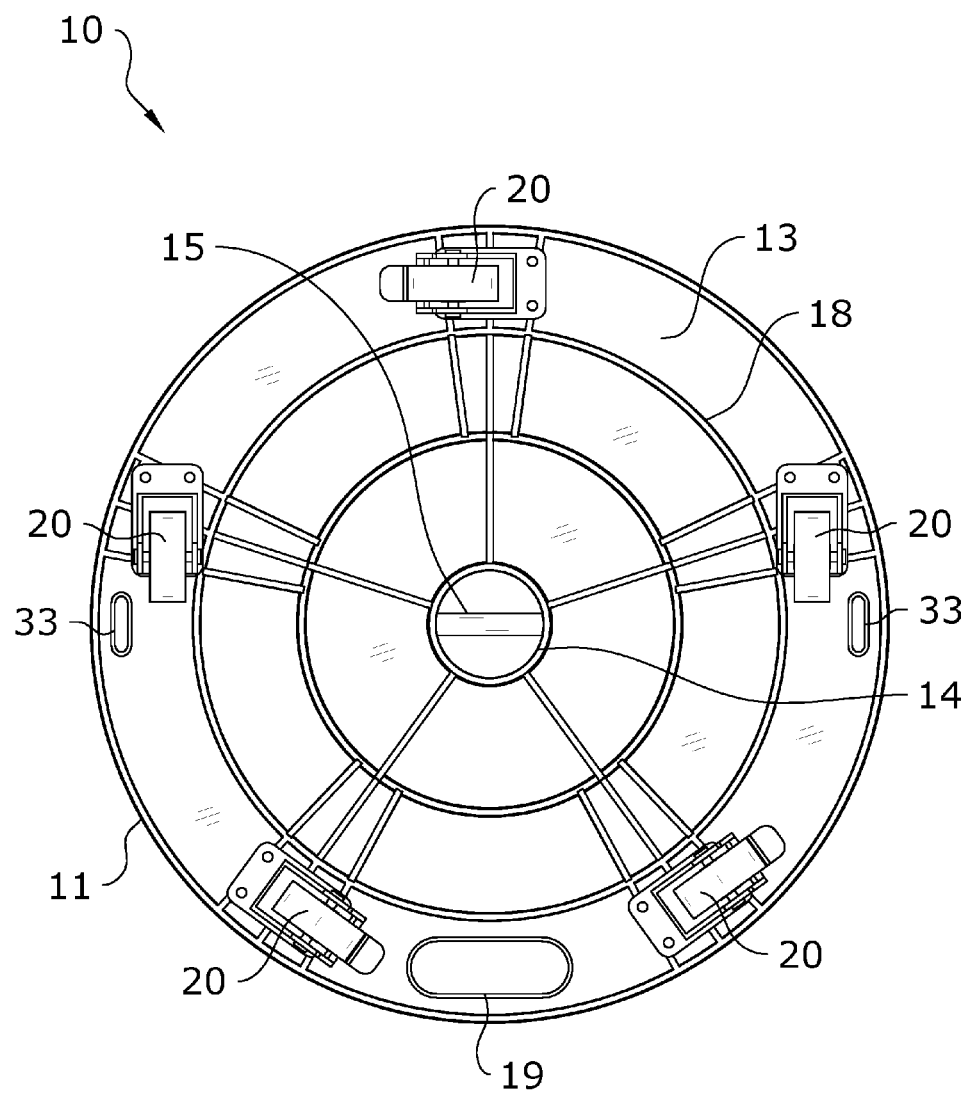
FIG. 5 is a bottom view of a vehicle tire cart in accordance with the exemplary embodiment of FIGS. 1-4.

As shown in FIG. 2, which provides a bottom view of the exemplary embodiment of FIG. 1, the lower platform surface 13 may comprise a plurality of caster wheels 20 which may be permanently or removably affixed to the lower platform surface 13. While the caster wheels 20 may be arranged in any configuration that allows for ease in wheeling the vehicle tire cart 10 over a ground surface, it may be preferable to position the caster wheels 20 proximal to the platform circumference 17 to increase stability during transport as shown in FIGS. 2-3 and 5. Additionally, while any number of caster wheels 20 may be used, as depicted in FIG. 5, it may be preferable to position the caster wheels 20 at approximately equal distances around the platform circumference as doing so improves the stability of the vehicle tire cart and prevents tipping of the vehicle tire cart when in use.

Figure 6:
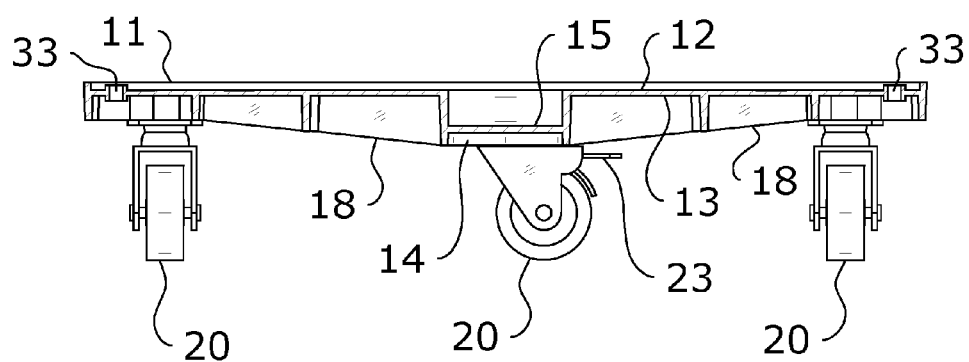
FIG. 6 is a cross-sectional view of the exemplary embodiment of a vehicle tire cart taken along the line as indicated in FIG. 4.

In some embodiments, the lower platform surface 13 may comprise one or more integral structural ribs 18 to increase the strength of the platform 11 such that the platform 11 is able to withstand a greater weight of a load when in use. The one or more integral structural ribs 18 may be located anywhere on the lower platform surface 13, but in some embodiments may extend radially from the platform opening 14 or be concentric to the platform circumference 17. Any appropriate number of integral structural ribs 18 may be used, however, as shown in FIGS. 2 and 6, it may be desirable to locate one or more structural ribs at the mounting point of the caster wheels 20 to facilitate the mounting of the caster wheels 20 as well as to increase the platform strength.

Figure 7:
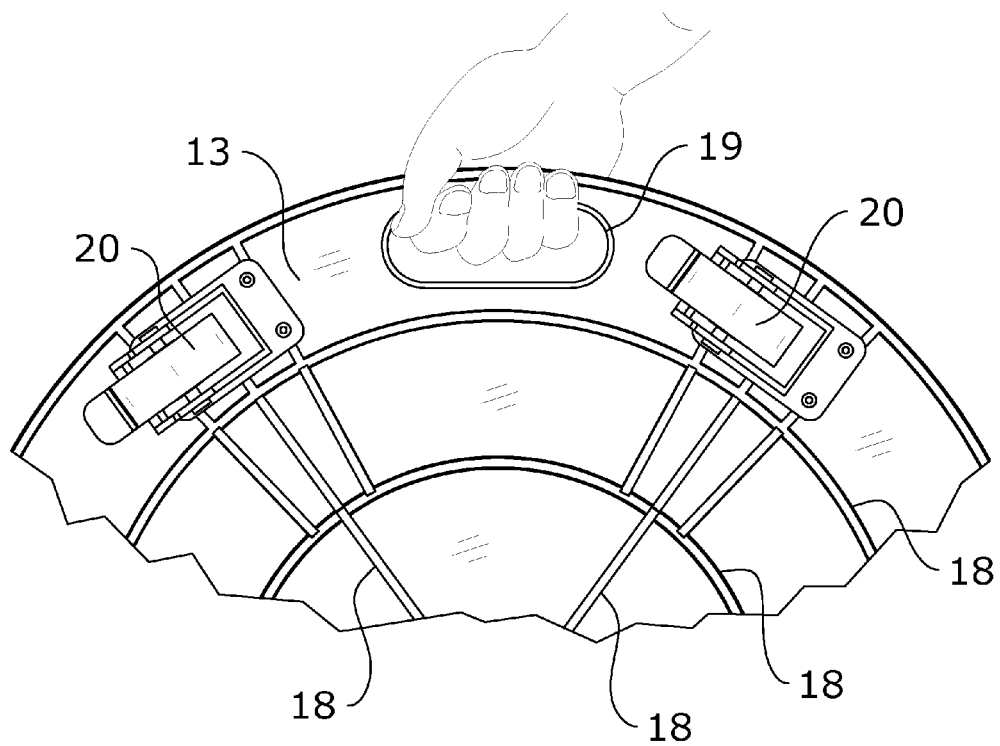
FIG. 7 is a bottom cutaway view of an exemplary embodiment of a vehicle tire cart having a hand grip opening.
Figure 8:
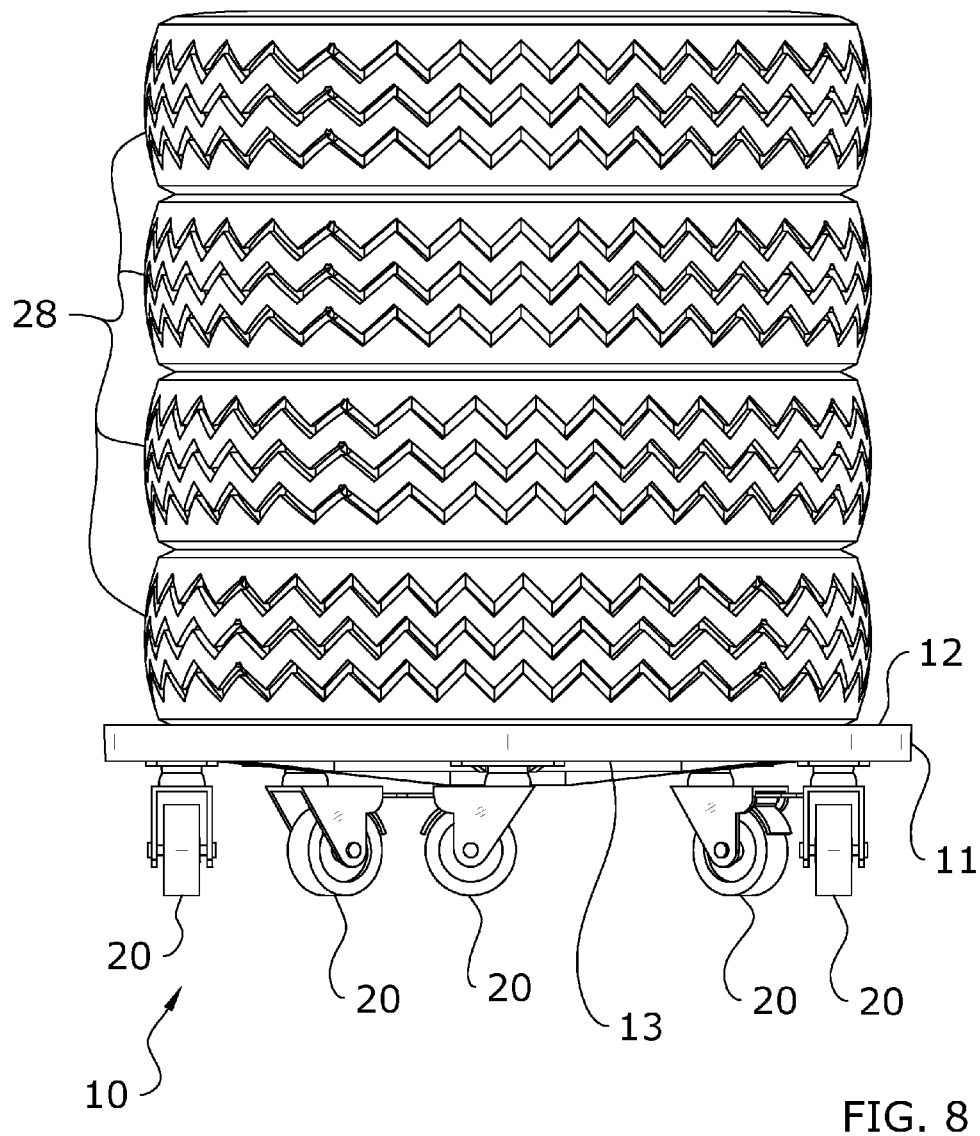
FIGS. 8-9 depict an exemplary embodiment of a vehicle tire cart when in use storing vehicle tires.
Figure 9:
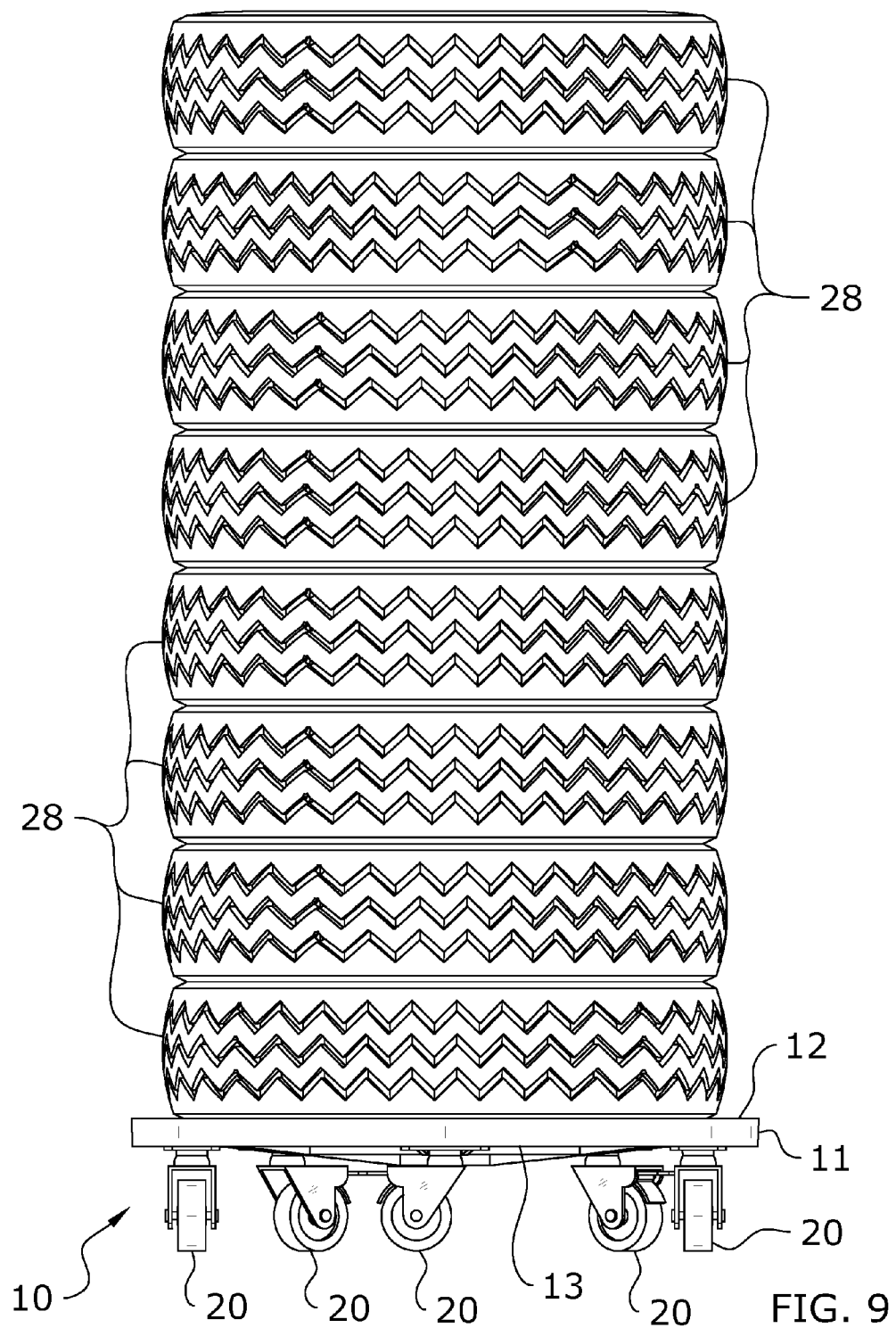

Some embodiments of a vehicle tire cart 10 may comprise one or more hand grip openings 19 as shown in FIG. 7. A user may utilize the hand grip opening 19, which may preferably be located proximal to the platform circumference 17 to easily grip and carry the vehicle tire cart 10 when not in use.

Figure 13A:
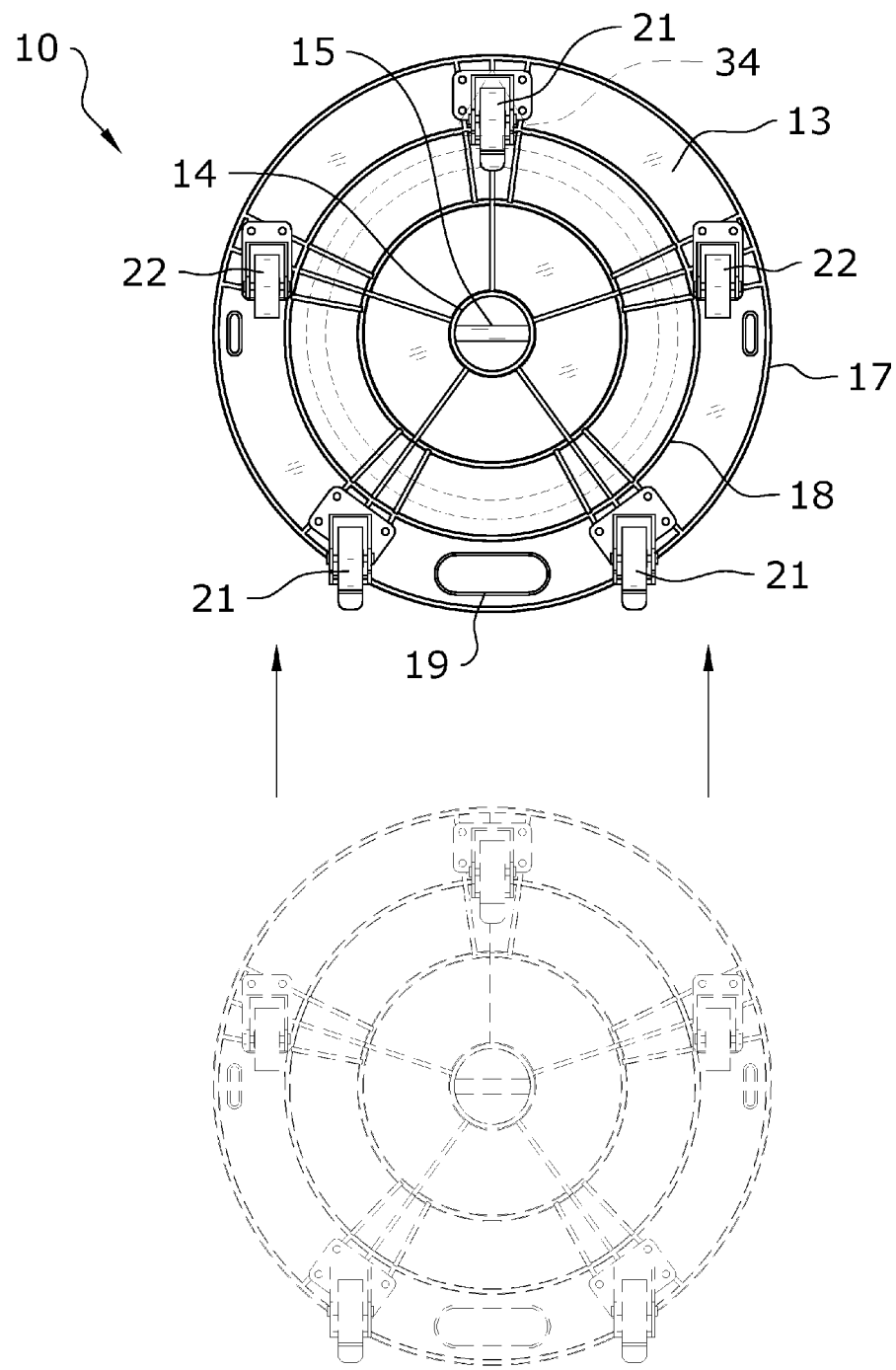
FIG. 13A depicts the exemplary embodiment of the vehicle tire cart of FIG. 13B in motion along a straight directional path in line with an orientation of the two stationary caster wheels.
Figure 13B:
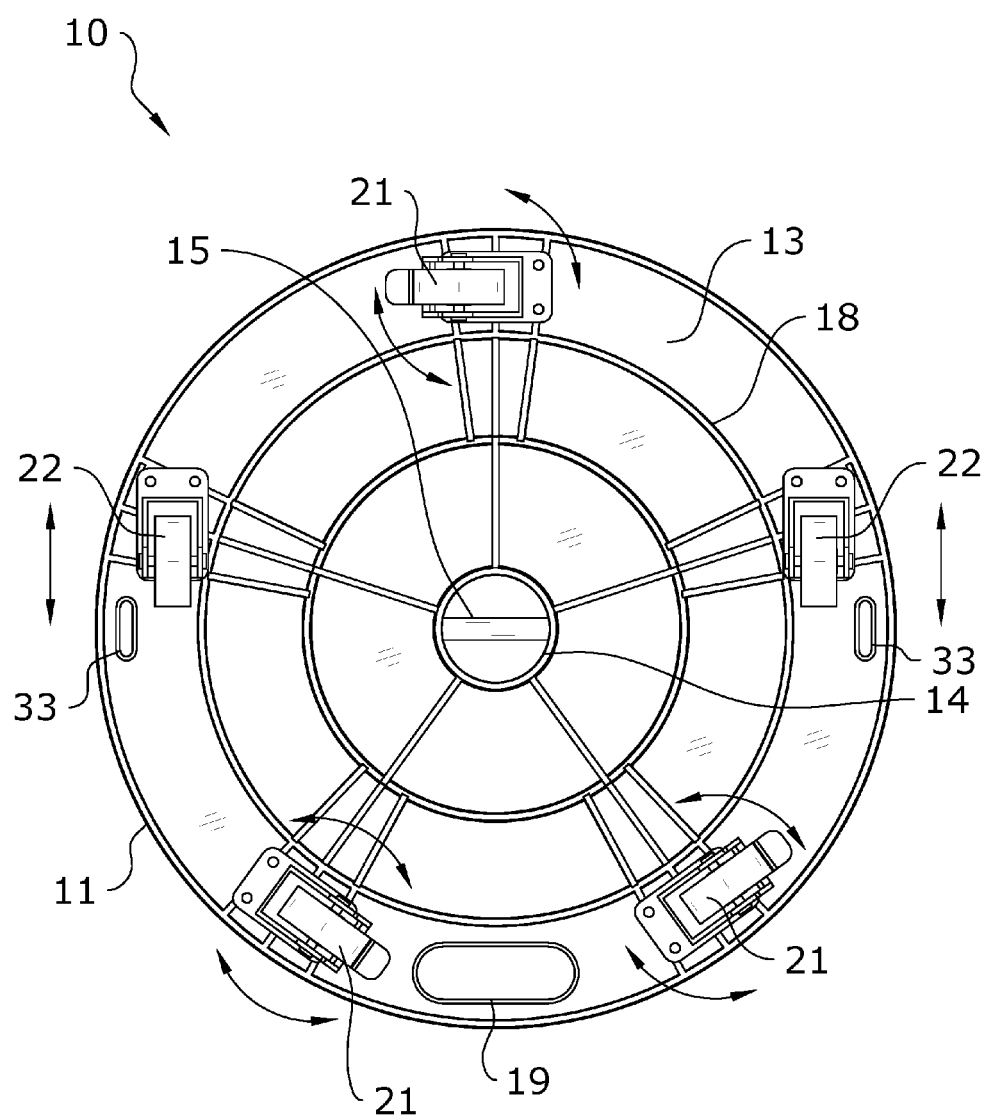
FIG. 13B provides a bottom view of an exemplary embodiment of a vehicle tire cart having stationary and swivel caster wheels.

While it is contemplated that the plurality of caster wheels 20 may comprise a uniform caster wheel type, in some embodiments, having a mix of both stationary caster wheels 22 and swivel caster wheels 21 may be advantageous for ease of steering the vehicle tire cart 10 while retaining the ability to move the vehicle tire cart 10 in a straight direction across a ground surface. For example, as depicted in FIG. 13B, by positioning two stationary caster wheels 22 such that the wheel orientation is parallel to one another, the vehicle tire cart 10 may be easily moved along the direction of the stationary caster wheel 22 orientation as shown in FIG. 13A. The molded arrow 34 or other directional indicator on the upper platform surface 12, while not visible when vehicle tires are placed on the platform, may be used as a guide to aid a user in properly orienting the vehicle tire cart 10 in an intended straight line direction of movement prior to loading the cart 10. Here, the stationary caster wheels 22 are positioned nonadjacent to each other along the platform circumference and the plurality of caster wheels 20 further comprises swivel caster wheels 21 which swivel to facilitate 360 degrees of rotation and steering of the vehicle tire cart 10 when transporting a load positioned on the platform 11 as shown in FIGS. 8-10A. While any appropriate number of swivel 21 and stationary caster wheels 22 may be used, in the embodiment of FIGS. 13-13A, two stationary caster wheels 22 are aligned parallel to one another with a single swivel caster wheel 21 positioned along the platform circumference 17 between them in the direction of straight-line forward motion and two additional swivel caster wheels 21 are located along the platform circumference 17 opposite the forward line of motion. This five caster wheel configuration provides the advantage of optimal stability of the vehicle tire cart 10 when carrying a heavy load such as a stack of vehicle tires 28 because the vehicle tire cart 10 may be moved in a straight direction while being steered and/or rotated thus providing maximal directional stability to prevent unwanted shifting of the vehicle tire stack due to an unintended change in the directional path of motion of the vehicle tire cart 10. Placement of the stationary 22 and swivel caster wheels 21 proximal to the platform perimeter at a location at which the vehicle tire weight rests is preferable so the that the caster wheels 21, 22 directly support the weight of the vehicle tires 28 on the platform. While it is possible to utilize the vehicle tire cart 10 to safely transport other objects, placement of heavy loads that rest inside the circumference of the caster ring or that are unevenly distributed may cause distortion of the platform 11.

Figure 11:
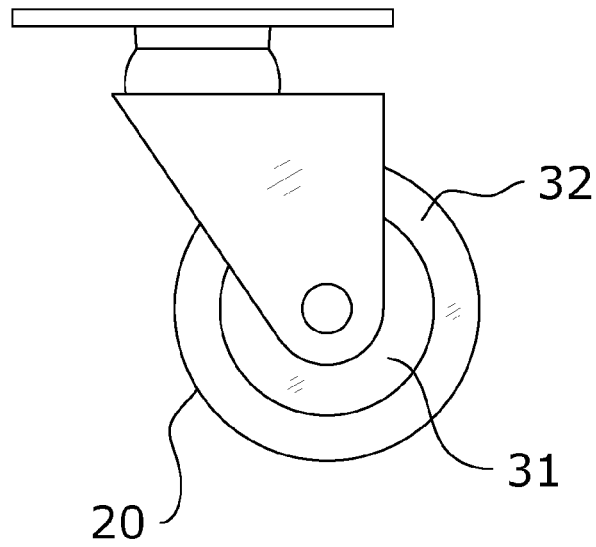
FIGS. 11-12 depict exemplary embodiments of caster wheels.
Figure 12:
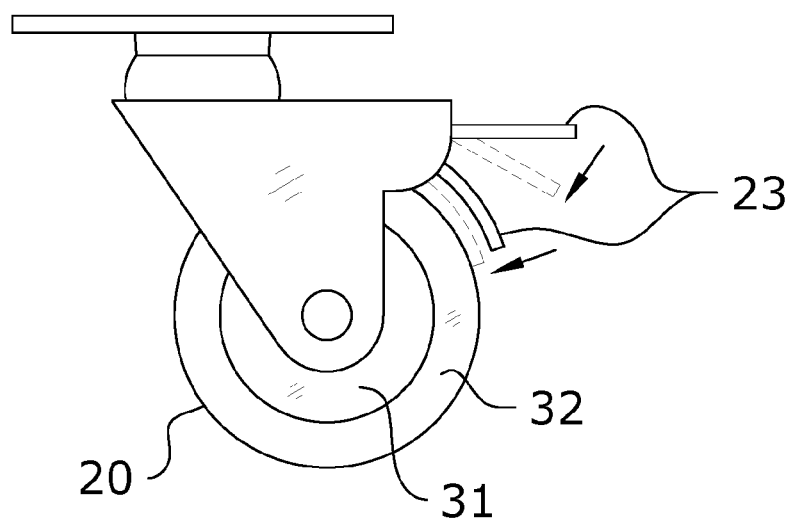

Any suitable type of caster wheel 20 may be used in any of the embodiments of a vehicle tire cart 10 described herein, such as for example, a non-braking caster wheel 20 as shown in FIG. 11. To prevent the vehicle tire cart 10 from moving when it is desired that the vehicle tire cart 10 remain in a particular position such as for example, when the vehicle tire cart 10 is used to display vehicle wheels or tires 28 in a retail or commercial setting, one or more caster wheels 20 having a brake lever 23 may be used. As shown in FIG. 12, the brake lever 23 remains in an unlocked position when the vehicle tire cart 10 is in motion and is then moved into a locked position when the vehicle tire cart 10 is located at a position at which the user desires the vehicle tire cart 10 to be located such as for example, in a location at which the user desires the vehicle tire cart 10 to serve as a retail or point-of-sale display or when the vehicle tire cart 10 is left unattended by the user. The caster wheels 20 may be comprised of any suitable material, however, it may be preferable that the wheel material 32 be comprised of a non-marking material that is of a texture that does not mar a flooring surface over which the vehicle tire cart 10 is transported. By non-limiting example, polyurethane or other plastics or polymers may be desirable materials from which the wheel material 32 may be comprised. The caster wheels 20 may further comprise a needle roller bearing 31 or any other suitably durable bearing.

Figure 10A:
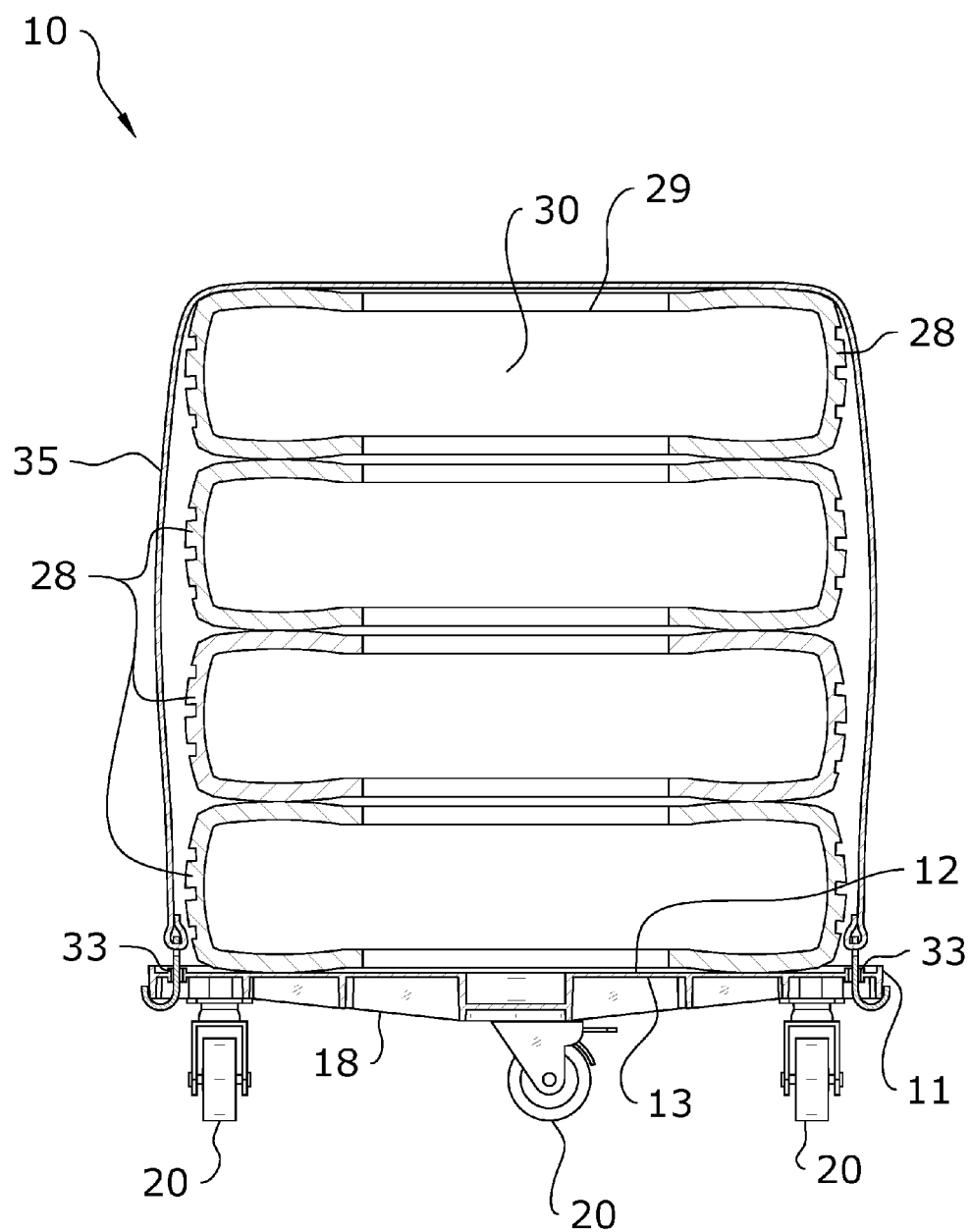
FIG. 10A depicts an exemplary embodiment of a vehicle tire cart in which vehicle tires are secured using a side strap.
Figure 10B:
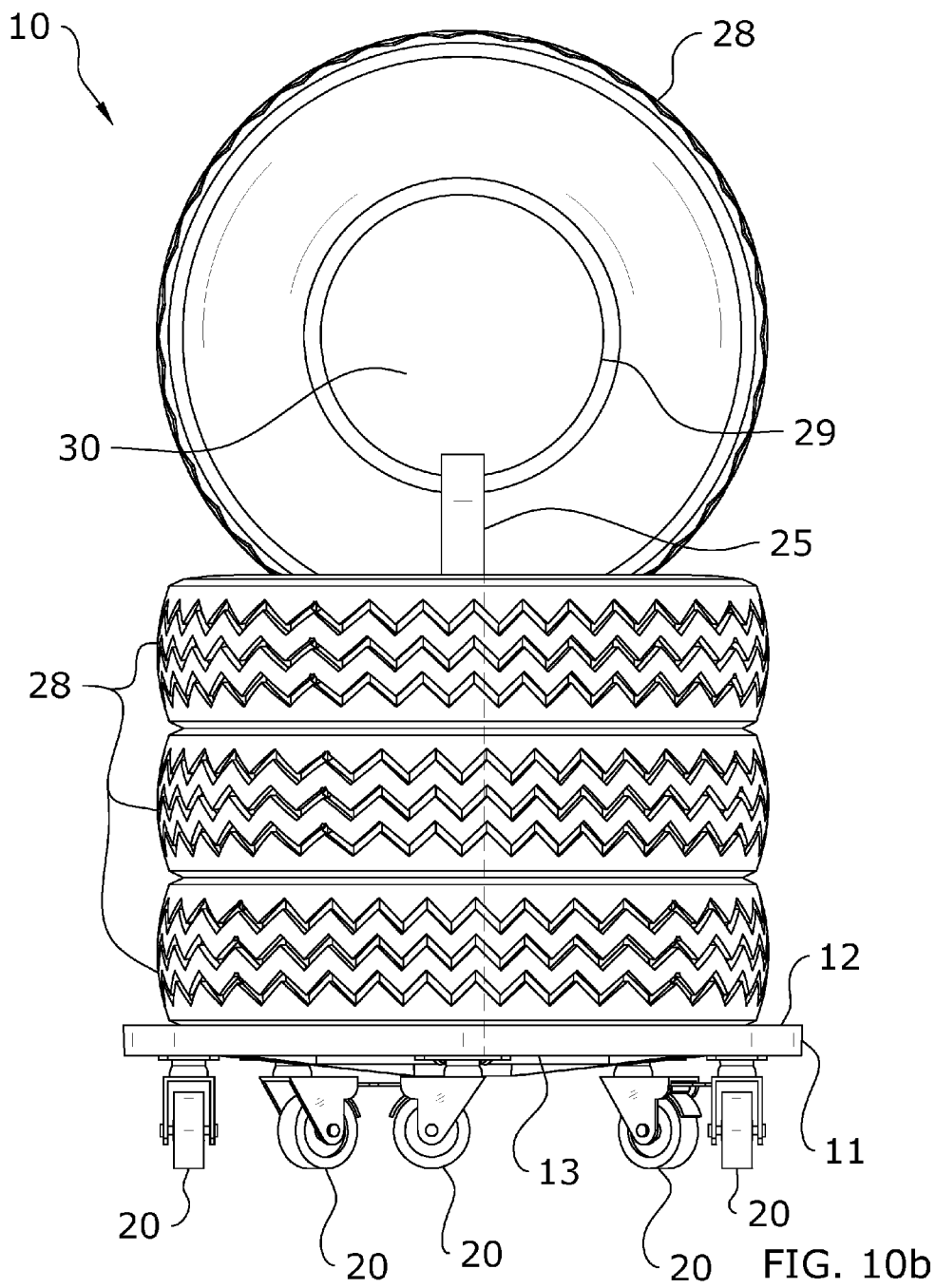
FIG. 10B depicts an exemplary embodiment of a vehicle tire cart in which vehicle tires are secured by a retaining strap running through an opening in the vehicle tires.
Figure 16:
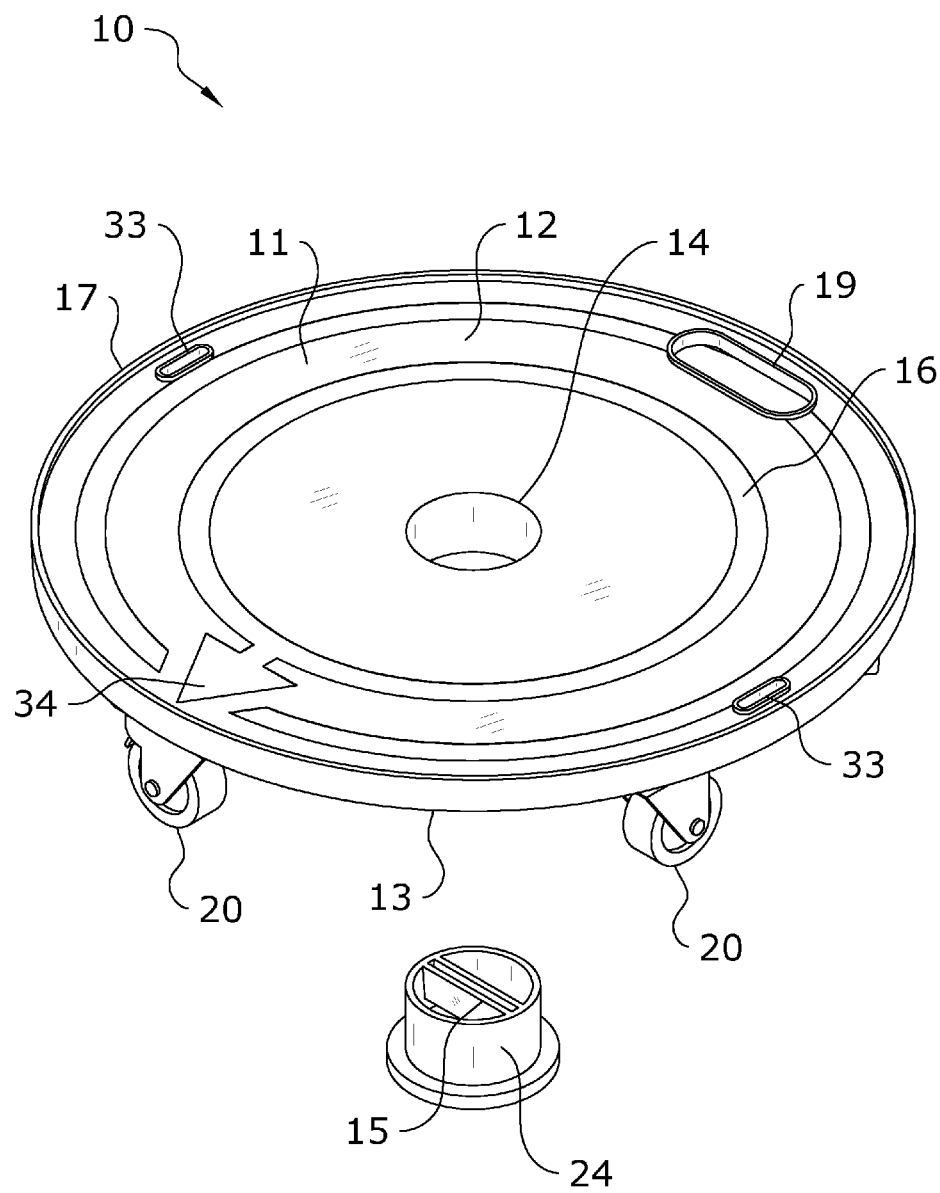
FIG. 16 is an exemplary embodiment of a vehicle tire cart having a restraining strap plug.
Figure 17:
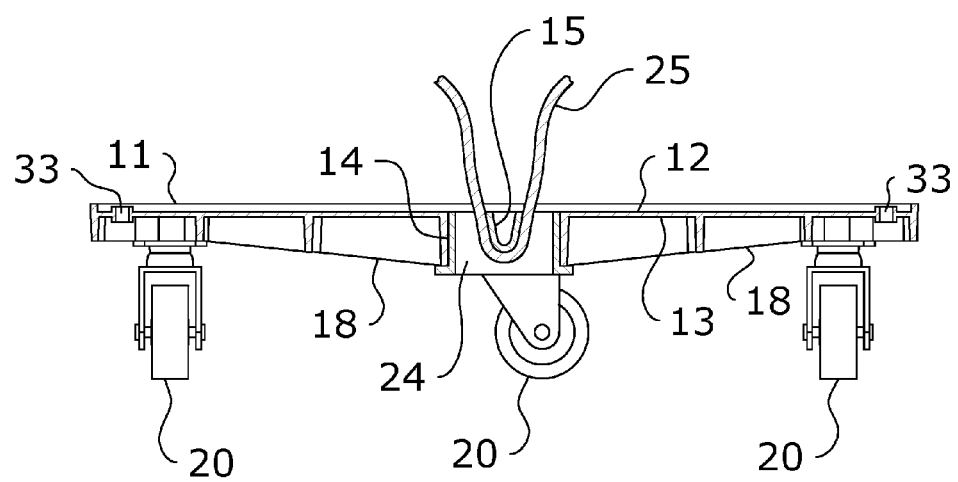
FIG. 17 is a cross-sectional view of the exemplary embodiment of a vehicle tire cart of FIG. 16.
Figure 18:
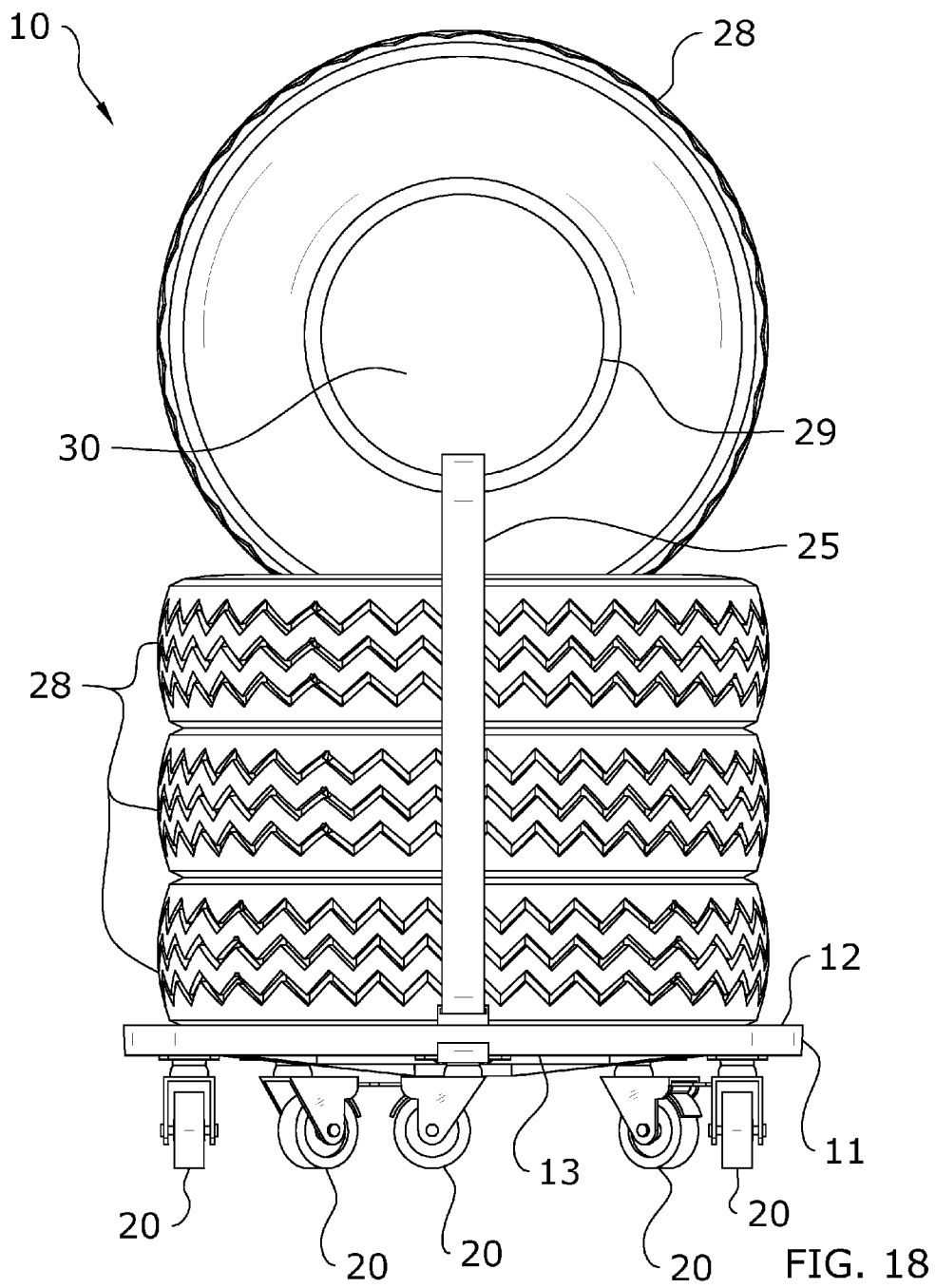
FIG. 18 depicts the exemplary embodiment of a vehicle tire cart in accordance with the exemplary embodiment of FIG. 16-17 while in use.

As shown in FIG. 16, some embodiments of a vehicle tire cart 10 may comprise a retaining strap plug 24 which is configured to removably couple to the platform 11 within the platform opening 14. The anchor 15 may be integral to the retaining strap plug 24 and configured to allow a retaining strap 25 to be passed under the anchor 15 as shown in FIG. 17 to secure a plurality of vehicle tires 28. As depicted in FIG. 10, a plurality of vehicle tires, which may optionally be mounted on vehicle wheels, may be secured by passing the retaining strap 25 under the anchor 15 and through the vehicle tire opening 30 within the inner circumference 29 of the last vehicle tire 28 placed on top of the stack of vehicle tires 28 when the last vehicle tire 28 is positioned vertically relative to the horizontal orientation of the stacked vehicle tires 28 on the upper platform surface 12. The retaining strap 25 may be passed through the vehicle tire opening 30 within the inner circumference 39 of the horizontally stacked tires 28 as shown in FIG. 10B, or alternatively may vertically pass over the outer tire surface to secure the stacked vehicle tires 28 as shown in FIG. 18. The retaining strap 25 may apply pressure to the stack of vehicle tires 28 once the retaining strap 25 is secured, thereby compressing the vehicle tires, which results in increased column strength and stability due to the center of mass of the stacked vehicle tires 28 being as low as possible. Some embodiments of the vehicle tire cart 10 may comprise one or more side strap openings 33 which may preferably be located proximal to the platform circumference 17 as shown in FIGS. 1-2 and 4-5 through which a side strap 35 may pass for additional support in securing objects such as vehicle tires 28. FIG. 10A provides an example of a side strap 35 in use while securing a stack of vehicle tires 28. The side strap 35 may be used by itself or in addition to a retaining strap 25 and may pass through side strap openings 33 and run underneath the platform 11 or alternatively, as shown in FIG. 10A, a hook or other fastener may be secured within the side strap opening 33 to secure the side strap 35 when in use.

Figure 14:
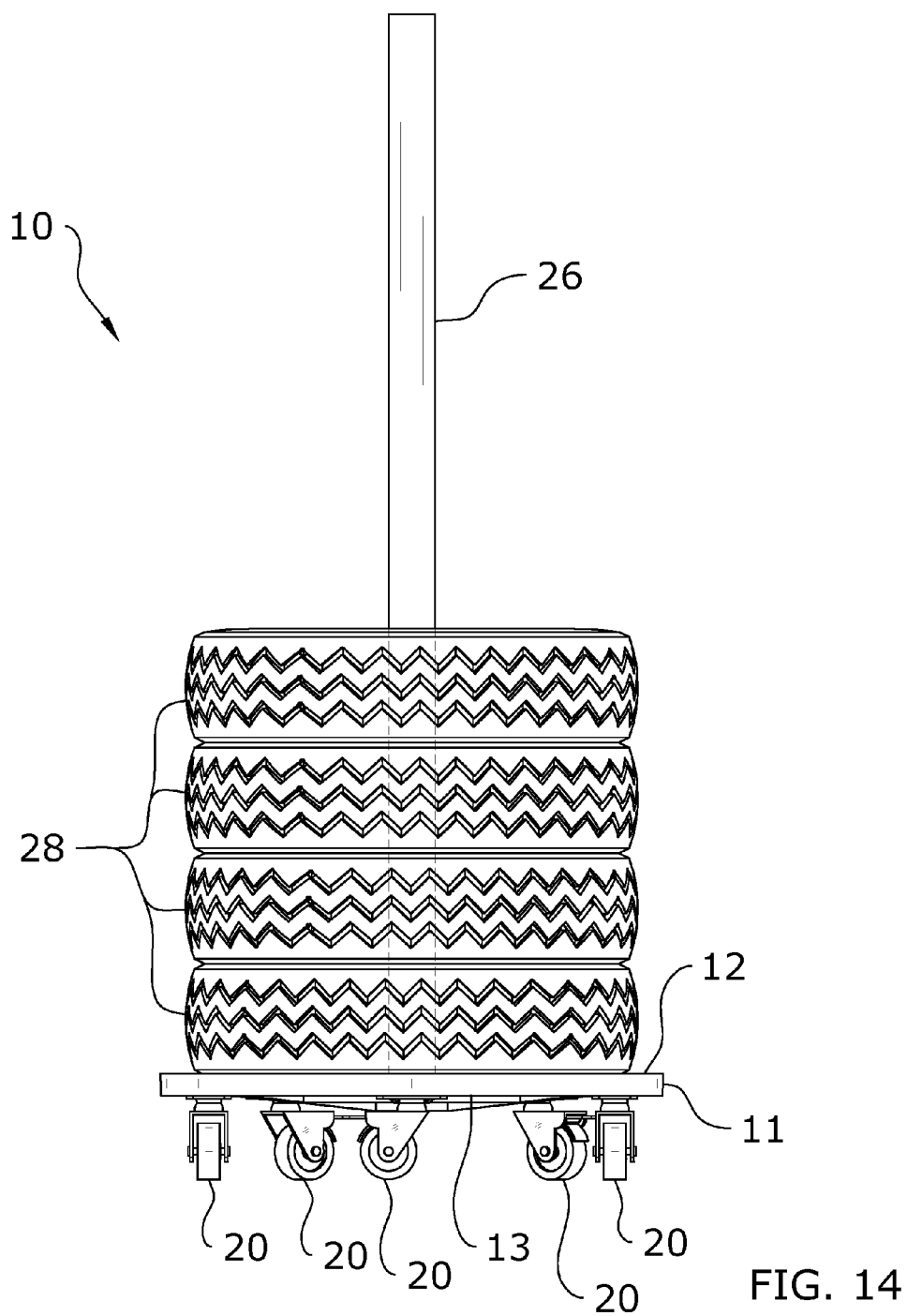
FIGS. 14-15 depict exemplary embodiments of a vehicle tire cart comprising a pole and signage, respectively.
Figure 15:
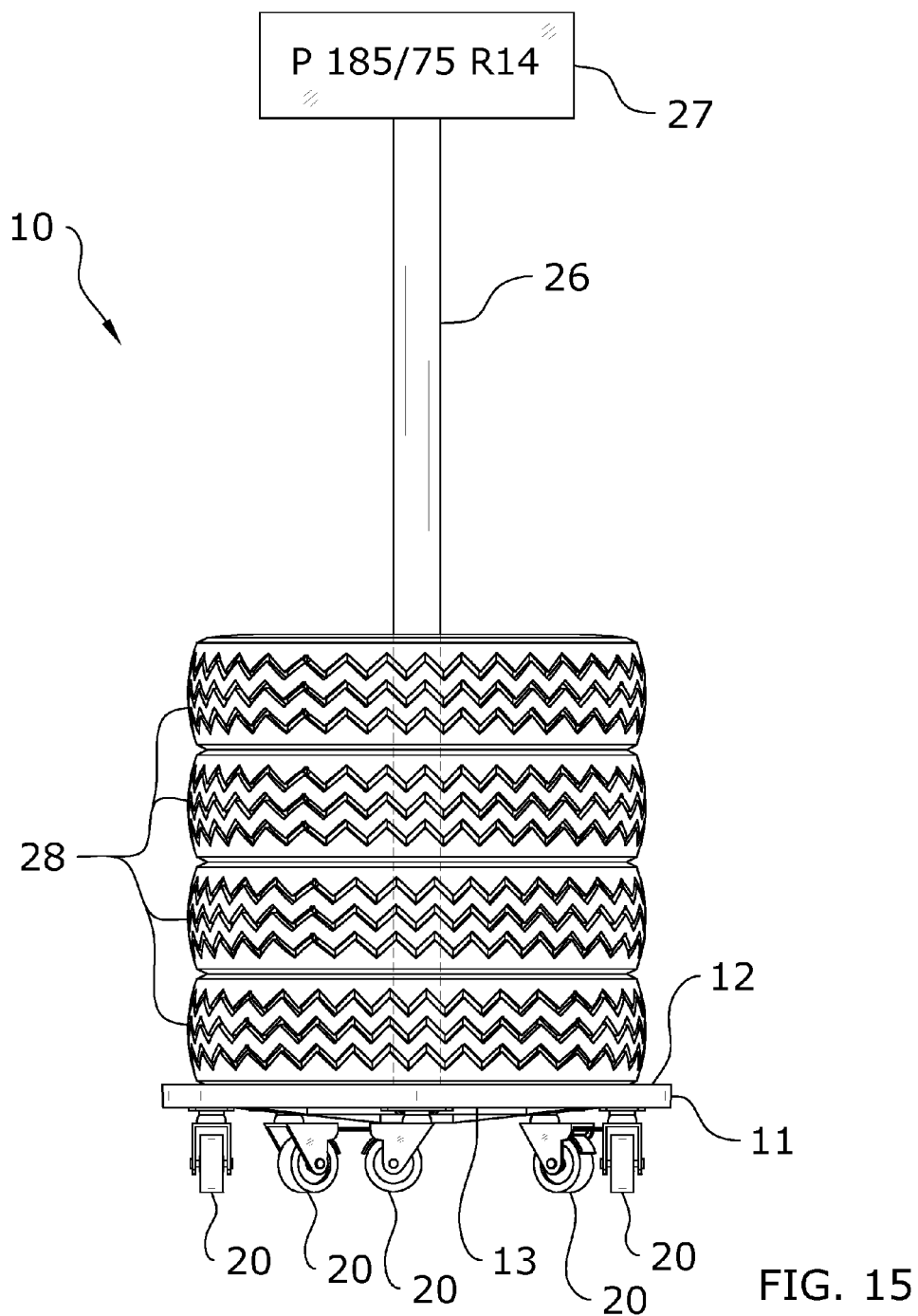

Alternatively, as shown in FIGS. 14-15, the retaining strap plug 24 may be removed from the platform opening 14 and a removable pole 26 may be inserted into the platform opening 14 which may alternatively also comprise signage 27 which may in some applications be electrified, that may be used as a retail or point-of-sale display.

A cable, chain, or other locking device may also be threaded under the anchor 15 and used to secure the vehicle tires 28 to prevent theft. It is also contemplated that the disclosed embodiments of a vehicle tire cart 10 may be used to transport objects other than vehicle tires 28 or wheels and in such instances, a retaining strap 25 may be threaded under the platform 11 such that solid objects that lack a vehicle tire opening 30 may be secured to the platform 11 for safe transportation and storage. In some embodiments, a handle may be removably attached to the platform 11 to allow for ease of pushing or pulling stacks of vehicle tires 28. The handle may be rigid, telescoping, or collapsible and may be used to join multiple vehicle tire carts 10 together.

It is to be understood that the embodiments and claims are not limited in application to the details of construction and arrangement of the components set forth in the description and/or illustrated in drawings. Rather, the description and/or the drawings provide examples of the embodiments envisioned, but the claims are not limited to any particular embodiment or a preferred embodiment disclosed and/or identified in the specification. Any drawing figures that may be provided are for illustrative purposes only, and merely provide practical examples of the invention disclosed herein. Therefore, any drawing figures provided should not be viewed as restricting the scope of the claims to what is depicted.

The embodiments and claims disclosed herein are further capable of other embodiments and of being practiced and carried out in various ways, including various combinations and sub-combinations of the features described above but that may not have been explicitly disclosed in specific combinations and sub-combinations

What is claimed is:

1. A vehicle tire cart comprising:
   a substantially round platform configured to store at least one vehicle tire, the substantially round platform comprising:
      an upper surface;
      a lower surface comprising a plurality of caster wheels coupled thereto, the plurality of caster wheels comprising at least one swivel caster wheel and at least one stationary caster wheel;
      an opening passing through the substantially round platform from the upper surface to the lower surface, the opening located at about a center of the substantially round platform;
      at least one of a hand grip opening and a side strap opening in the substantially round platform; and
      an anchor configured to secure a retaining strap.

2. The vehicle tire cart of claim 1, further comprising a retaining strap plug to which the anchor is attached, the retaining strap plug configured to be positioned within the opening.

3. The vehicle tire cart of claim 1, wherein the anchor is integral to the substantially round platform within the opening in the substantially round platform.

4. The vehicle tire cart of claim 1, wherein the plurality of caster wheels is located substantially equidistant from one another along a circumference of the lower surface of the substantially round platform.

5. The vehicle tire cart of claim 1, wherein the plurality of caster wheels comprises two stationary caster wheels having a substantially parallel wheel orientation and a plurality of swivel caster wheels along the circumference of the lower surface of the substantially round platform.

6. The vehicle tire cart of claim 1, further comprising at least one integral structural rib on a bottom surface of the substantially round platform.

7. The vehicle tire cart of claim 6, wherein the at least one integral structural rib is located concentric to the circumference of the substantially round platform or extends radially from the opening in the substantially round platform.

8. The vehicle tire cart of claim 1, wherein the opening is further configured to retain a removable pole.

9. A method of securing one or more vehicle tires comprising:
   placing the one or more vehicle tires laterally on an upper surface of a platform of a vehicle tire cart that comprises a plurality of caster wheels coupled to a lower surface of the platform and an opening that is vertically aligned with an opening within an inner circumference of the one or more vehicle tires;
   passing a retaining strap around an anchor located in the opening in the platform, wherein the anchor is coupled to the platform via a removable retaining strap plug located within the opening in the platform and the method further comprises inserting a pole into the opening when the retaining strap plug has been removed; and
   securing the one or more vehicle tires using the retaining strap such that the one or more vehicle tires remains vertically aligned with the platform when the platform is wheeled across a ground surface.

10. The method of claim 9, further comprising:
    placing an additional vehicle tire vertically on top of the one or more laterally positioned vehicle tires on the upper surface of the platform; and
    securing the additional vehicle tire and the one or more vehicle tires by further passing the retaining strap through an opening within an inner circumference of the additional vehicle tire.

11. The method of claim 9, wherein the pole further comprises signage.

12. The method of claim 9, further comprising steering the platform while wheeling it across the ground surface by changing the direction in which the platform is traveling by swiveling one or more swiveling caster wheels from among the plurality of caster wheels.

13. The method of claim 9, further comprising wheeling the platform in an intended direction of travel by aligning one or more stationary caster wheels from among the plurality of caster wheels in the intended direction of travel.

14. A vehicle tire cart comprising:
    a substantially round platform configured to store at least one vehicle tire, the substantially round platform comprising:
       an upper surface;
       a lower surface comprising a plurality of caster wheels coupled thereto;
       at least one of a hand grip opening and a side strap opening in the substantially round platform; and
       an anchor configured to secure a retaining strap.

15. The vehicle tire car of claim 14, including an opening passing through the substantially round platform from the upper surface to the lower surface.

16. The vehicle tire car of claim 14, wherein the side strap opening is located near an outer perimeter of the substantially round platform.

17. The vehicle tire car of claim 14, wherein the plurality of caster wheels comprises two stationary caster wheels having a substantially parallel wheel orientation and a plurality of swivel caster wheels.

18. A vehicle tire cart comprising:
    a substantially round platform configured to store at least one vehicle tire, the substantially round platform comprising:
       an upper surface;
       a lower surface comprising a plurality of caster wheels coupled thereto, the plurality of caster wheels comprising at least one swivel caster wheel and at least one stationary caster wheel;
       an opening passing through the substantially round platform from the upper surface to the lower surface, the opening located at about a center of the substantially round platform, wherein the opening is further configured to retain a removable pole; and
       an anchor configured to secure a retaining strap.

19. The vehicle tire cart of claim 18, further comprising at least one integral structural rib on a bottom surface of the substantially round platform.

20. The vehicle tire cart of claim 19, wherein the at least one integral structural rib is located concentric to the circumference of the substantially round platform or extends radially from the opening in the substantially round platform.

21. The vehicle tire cart of claim 19, wherein the at least one integral structural rib is located concentric to the circumference of the substantially round platform.

22. The vehicle tire cart of claim 19, wherein the at least one integral structural rib extends radially from the opening in the substantially round platform.

23. A vehicle tire cart comprising:
   a substantially round platform configured to store at least one vehicle tire, the substantially round platform comprising:
      an upper surface;
      a lower surface comprising a plurality of caster wheels coupled thereto, the plurality of caster wheels comprising at least one swivel caster wheel and at least one stationary caster wheel;
      an opening passing through the substantially round platform from the upper surface to the lower surface, the opening located at about a center of the substantially round platform;
      at least one integral structural rib on a bottom surface of the substantially round platform, wherein the at least one integral structural rib is located concentric to the circumference of the substantially round platform or extends radially from the opening in the substantially round platform; and
      an anchor configured to secure a retaining strap.

24. The vehicle tire cart of claim 23, wherein the plurality of caster wheels is located substantially equidistant from one another along a circumference of the lower surface of the substantially round platform.

25. The vehicle tire cart of claim 23, wherein the plurality of caster wheels comprises two stationary caster wheels having a substantially parallel wheel orientation and a plurality of swivel caster wheels along the circumference of the lower surface of the substantially round platform.

* * * * *